UNITED STATES PATENT OFFICE.

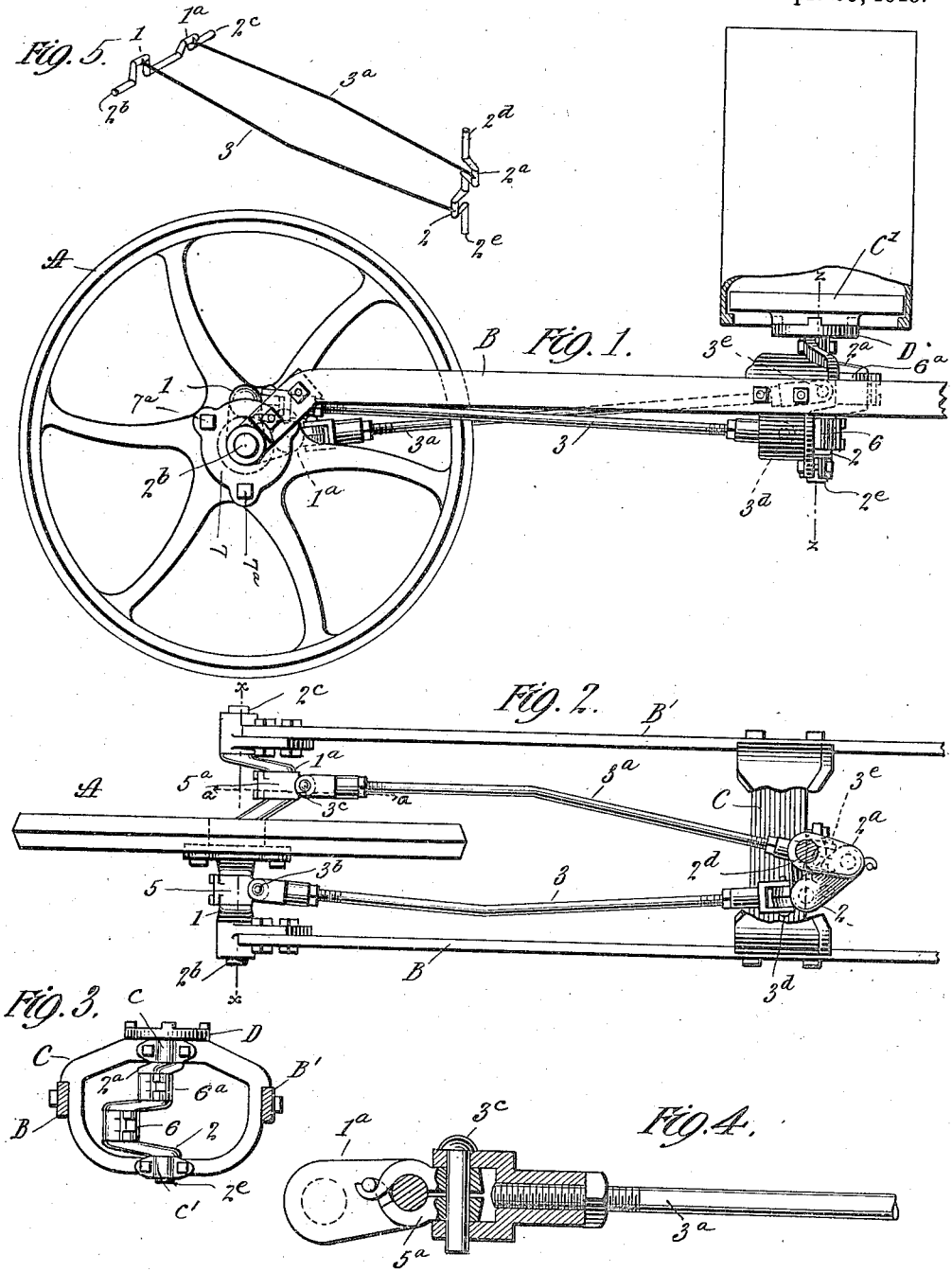

ALEXUS C. LINDGREN, OF MOLINE, ILLINOIS, ASSIGNOR TO MOLINE PLOW COMPANY, A CORPORATION OF ILLINOIS.

MECHANICAL MOVEMENT.

1,301,854.  Specification of Letters Patent.  Patented Apr. 29, 1919.

Application filed December 7, 1910. Serial No. 596,008.

*To all whom it may concern:*

Be it known that I, ALEXUS C. LINDGREN, of Moline, county of Rock Island, and State of Illinois, have invented new and useful Improvements in Mechanical Movements, of which the following is a specification.

This invention relates to mechanical movements designed to convert a rotary motion about one axis into a rotary motion about another axis angularly related to the first axis, the object of the invention being to dispense with the employment of gears, driving chains, and the like, in transmitting the motion from the driving to the driven member.

With this end in view the invention consists in the combination with driving and driven members rotatable about axes disposed at substantially right angles to each other and provided with cranks, of two pitmen connecting said cranks and so spaced at their points of connection with the cranks, as to prevent objectionable binding in the rotation of the parts.

The invention is designed with special reference to the transmission, in agricultural machinery, of the rotary motion of a ground wheel about a horizontal axis to a driven member rotatable about a vertical axis, such application of the invention being peculiarly useful in connection with seeding machines in transmitting the motion of the ground-wheel to the horizontally rotatable seed plate. By the employment of the invention for this purpose, the use of driving chains or gears or eccentrics between the ground-wheel axle and the seed driving shaft, which parts are so apt to become clogged by dirt, is dispensed with and the motion may be transmitted positively and smoothly without liability of interruption by the accumulation of dirt.

It will be understood, however, that my invention may be employed in other connections and wherever it is desired to transmit a rotary motion about one axis to a driven member rotating about an axis angularly related to the axis of the driver, and it is the intention herein to claim the invention broadly and as applicable for whatever use it may be suitable.

In the accompanying drawings:

Figure 1 is a side elevation of my improved mechanism applied to transmit the motion of the ground wheel of a seeding machine to the seeding mechanism, parts being broken away to expose other parts to view.

Fig. 2 is a top plan view of the same.

Fig. 3 is a transverse section on the line $z$—$z$ of Fig. 1, showing in elevation the driven cranks.

Fig. 4 is a vertical section on the line $a$—$a$ of Fig. 2, showing the connection between one of the connecting rods and its driving crank.

Fig. 5 is a perspective view in the nature of a diagram, showing the angular relations between the driving cranks and between the driven cranks.

My improved mechanism embodies as its essential features, driving cranks, 1, $1^a$, rotatable about a common axis, as indicated by the dotted line $x$—$x$ of Fig. 2; driven cranks 2, $2^a$, rotatable about a common axis, as indicated by the dotted line $z$—$z$ of Fig. 1, this latter axis extending vertically at right angles to the axis of the driving cranks, which extends horizontally; and connecting rods 3, $3^a$, which are operatively connected at one of their ends to the driving cranks, and operatively connected at their opposite ends to the driven cranks in such manner that the rotation of the driving cranks will, through these connecting rods, transmit a corresponding movement to the driven cranks.

In the particular application of the invention to seeding machines as here shown, the driving cranks are connected respectively to opposite sides of a ground wheel A, adapted as the machine is advanced over the field, to be rotated as usual, and the outer ends of the cranks are formed with journal studs $2^b$ and $2^c$ respectively, mounted in journal bearings on the forward ends of two frame bars B, B', by which construction the cranks are rotatable on a horizontal axis coincident with the axis of the ground wheel. The frame bars B, B' are extended rearwardly and have fixed between them a transverse yoke C, provided in its upper and lower sides with bearing openings $c$, $c'$, in which are mounted studs $2^d$ and $2^e$ on the respective ends of the driven cranks; whereby said driven cranks are rotatable about a vertical axis coincident with a line extending centrally through said studs. The driven cranks may be connected in any suitable manner with the part or member to be operated. In this instance, they are connected with a driving member D fixed to the stud $2^d$ of the upper driven crank, which driving member is interlocked with a horizontal seed distributing plate C', so that by the operation of these cranks, the member D will be rotated about a vertical axis and will impart a corresponding motion to the distributing plate.

The connecting rods 3, $3^a$, before alluded to, have their forward ends jointed to collars 5, $5^a$, by means of vertical pivot pins $3^b$ and $3^c$ extending loosely through the ends of the rods and through the collars, which latter loosely encircle the two driving cranks respectively. The rear ends of said rods are jointed on horizontal axes formed by horizontal pivot pins $3^d$ and $3^e$, to collars 6, $6^a$, which latter loosely encircle the driven cranks respectively.

As a result of the construction described, when the driving cranks are rotated—as by the rotation of the ground wheel, due to the advance of the machine over the ground, where the structure is applied to a seeding machine—a corresponding motion will be imparted to the driven cranks, the forward ends of the connecting rods swinging vertically up and down and around the horizontal axis of the driving cranks, and the rear ends of the rods swinging horizontally and around the vertical axis of the driven cranks, the pivotal connection of the rods with the respective collars on the two sets of cranks, permitting the ends of the rods to thus move at right angles to each other.

By reason of the fact that the axis of one set of cranks is horizontal and that of the other set vertical, there will be an interference or binding of the parts in their rotation unless provision is made to prevent it. This interference or binding results by reason of the fact that while one end of a pitman is describing an arc in one plane, the other end is describing an arc which intersects this plane. The effect of this is to bring about an apparent shortening of the distance between the points at which the ends of the pitmen are connected. This condition obviously would not be present if the axes of the two sets of cranks were parallel to each other, because then, both ends of a pitman would be traveling in similar arcs in the same plane and the distance between the points at which the ends are connected would remain constant. In my improved construction I make provision for meeting this condition by so disposing and arranging the parts with relation to each other that objectionable binding will be eliminated. This may be effected by so constructing and arranging the parts that the included angle of one set of cranks will be greater than that of the other set; or the distance separating the pitmen at one end may be made greater than at the other end. In the particular construction shown herein both of these conditions are, by way of example, illustrated as present, that is, the included angle of the driven cranks is shown as greater than that of the driving cranks and also the pitmen are shown as separated from each other a greater distance at their forward ends than they are at their rear ends. It is to be understood, however, that in some constructions, only one of these relative dispositions of the parts may be utilized.

The driving cranks 1, $1^a$, may be of any appropriate form and connected with a wheel in any appropriate and suitable manner, but I prefer to adopt in this respect the particular construction and arrangement shown in the drawings. Here it will be seen that the cranks are illustrated as formed on a single crank shaft which extends through a central opening in the hub of the wheel and is firmly fixed thereto by means of a disk-like flange 7 on the shaft, which is seated flatly against the hub of the wheel and is secured thereto by a number of fastening bolts $7^a$ passing through the flange and through the hub.

By the construction described it is seen that the motion from the wheel (and, thus, from the driving to the driven crank) is transmitted entirely by the two sets of cranks and their connecting rods, and without the employment of chains, intermeshing gears, eccentrics and the like, and this notwithstanding the fact that the axis of the driven member is at right angles to the axis of the driving member.

Having thus described my invention what I claim is:

In a mechanical movement, the combination of a driving member rotatable about a horizontal axis, a driven member rotatable about a vertical axis, a vertically arranged driving element connected with the driving member to rotate the same, two cranks on the driving member at opposite sides of the driving element, two cranks on the driven member, a connecting rod loosely connected at one end with one of the cranks on the driving member and loosely connected at its other end with the corresponding crank on the driven member, and a second connecting rod loosely connected at one end with the other crank on the driving member and loosely connected at its opposite end with the corresponding crank on the driven member, the said cranks on the driving member being separated a greater distance from each other axially than the separation of the cranks on the driven member; whereby there will be no interference of the connecting rods with the driving element in the transverse swing of the ends of the connecting rods where they join the cranks on the driven member.

In testimony whereof I hereunto set my hand this 12th day of November, 1910, in the presence of two attesting witnesses.

ALEXUS C. LINDGREN.

Witnesses:
C. R. STEPHENS,
F. G. ALLEN.

Copies of this patent may be obtained for five cents each, by addressing the "Commissioner of Patents, Washington, D. C."